(12) United States Patent
Spinella et al.

(10) Patent No.: US 6,263,893 B1
(45) Date of Patent: Jul. 24, 2001

(54) ADJUSTABLE MULTI-PURPOSE WAGON CANOPY

(76) Inventors: Carolyn Spinella, 22 Armagh Way, Nepean (CA), K2J 4C3; Marnie Colasante, 13 Avery Crescent, Nepean (CA), K2J 2M3

( * ) Notice: Subject to any disclaimer, the term of this patent is extended or adjusted under 35 U.S.C. 154(b) by 0 days.

(21) Appl. No.: 09/416,533

(22) Filed: Oct. 12, 1999

(30) Foreign Application Priority Data

Oct. 16, 1998 (CA) .................................................. 2251404

(51) Int. Cl.[7] .................................................. E04H 15/06
(52) U.S. Cl. ........................................ 135/88.01; 135/119
(58) Field of Search ............................. 135/88.01, 88.02, 135/120.2, 119

(56) References Cited

U.S. PATENT DOCUMENTS

| | | |
|---|---|---|
| D. 378,997 | 4/1997 | Marozza et al. . |
| D. 388,473 | 12/1997 | Pasin et al. . |
| 5,560,383 | 10/1996 | Fuller . |
| 5,579,796 * | 12/1996 | Mallo et al. ........................ 135/88.01 |
| 5,660,425 * | 8/1997 | Weber ........................... 135/88.01 X |
| 5,843,548 * | 12/1998 | Sanders .............................. 135/88.01 |

FOREIGN PATENT DOCUMENTS 2169580    8/1997   (CA) .

* cited by examiner

Primary Examiner—Anthony D. Barfield
(74) Attorney, Agent, or Firm—Harold C. Baker; Robert A. Wilkes; Robert G. Hendry

(57) ABSTRACT

An adjustable multi-purpose wagon canopy used to shade wagon occupants from the sun. The wagon canopy comprises: support members which are releasably connected to a wagon using mounting bracket assemblies rigidly fixed to the wagon; and a cover which is attached to the support members using a variety of attachment methods. The cover is adjustable both in length and in width while the support members are adjustable in height. The wagon canopy can be attached to wagons of differing sizes and can also be transplanted from a wagon to locations that have a sandy or soft ground.

11 Claims, 6 Drawing Sheets

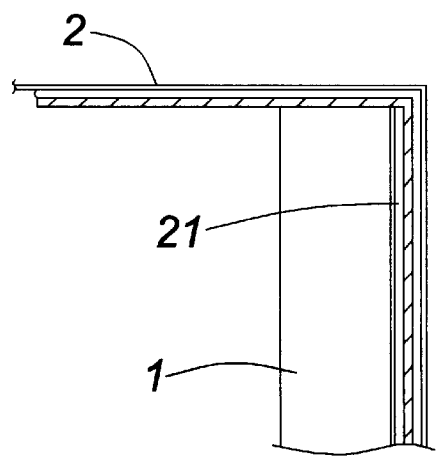
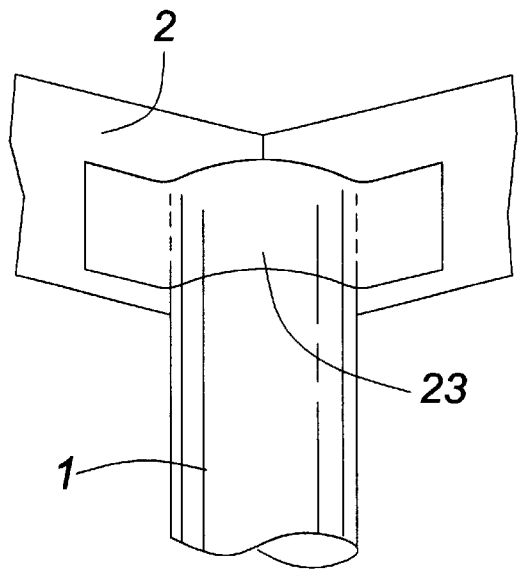
FIG. 8  FIG. 9
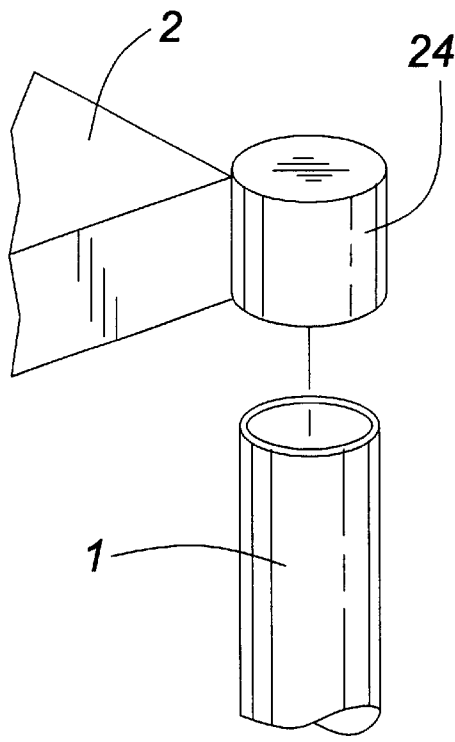
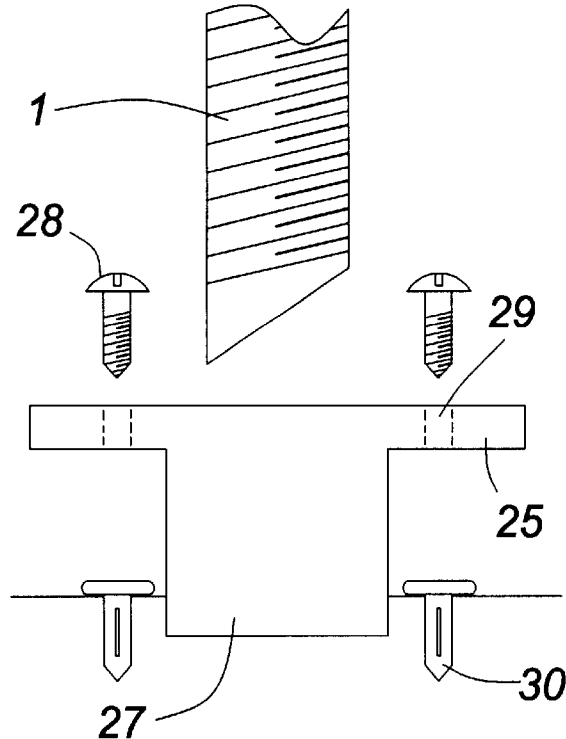
FIG. 10  FIG. 11

ADJUSTABLE MULTI-PURPOSE WAGON
CANOPY

FIELD OF INVENTION

This invention relates to sun canopies and in particular to sun canopies which can be removably attached to wagons.

DESCRIPTION OF THE RELATED PRIOR ART

Children's wagons are well known in the art and are commercially available in a variety of sizes. Parents regularly use wagons for transporting their young children in an effort to relieve themselves of the burden of physically lifting and carrying them. Although wagons provide an effective mode of transport, there are problems associated with them. In particular, children riding in wagons are exposed to the elements, especially the harmful rays of the sun. Young children are easily susceptible to sunburns and other damaging effects of the sun, thus requiring that they be protected from extended exposures to direct sunlight. Providing suitable clothing such as long sleeve shirts and hats minimizes exposure, but in particularly hot and humid climates, such clothing can be very uncomfortable, giving rise to other health problems such as heat exhaustion. Applying some form of sunblock also serves to protect the child, but sunblock needs to be reapplied on a regular basis to be effective, and ultimately will not protect the child where long periods of sun exposure are involved.

In order to overcome the above problems associated with standard wagons, canopies which could be attached to a wagon were developed, a number of which are found in the prior art. U.S. Pat. No. 5,560,383 issued Oct. 1, 1996 for example, seen in FIG. 1, discloses a height-adjustable wagon canopy comprising a single telescoping arm extending vertically from a wagon which is hinged to a canopy support. The canopy support can be rotated to a first position above the wagon floor or to a second retracted position where it rests along the telescoping arm. This wagon canopy is effective, but is deficient in several ways. Since the telescoping arm is permanently affixed to the wagon, the wagon canopy assembly cannot be readily moved to another wagon or utilized for any other applications. Further, the size of the canopy cannot be adjusted to fit wagons of differing sizes. Finally, due to the size and weight of the wagon canopy assembly and the bending moment resulting from its "L" shape, it can only be attached to a limited number of wagons which have walls that are thick enough to support the canopy assembly.

Another example of a wagon canopy is found in Canadian patent application 2,169,580 filed Feb. 15, 1996. This invention, seen in FIG. 2, discloses a canopy for a wagon or a sleigh. It comprises a rigid support frame to which a canopy is attached. The support frame is comprised of two vertical support units, each of which is composed of four members rotatably hinged together to form a "U". These support units are linked together by a cross-bracing member. The ends of the members which form the vertical support units have integral clamps comprised of U-shaped grips with a threaded bolt extending through one arm of the U-shaped grip. In order to secure the support frame to the wagon, the U-shaped grips are placed over the wagon wall and the threaded bolt is tightened against the wall. This wagon canopy has several drawbacks. Due to the manner in which it is clamped, the canopy assembly will skew in one direction if a longitudinal force is applied. As well, the wagon canopy cannot be adjusted to fit wagons of varying width. Further, the frame is not height-adjustable to accommodate children of varying sizes. Finally, the canopy cannot be readily used for purposes other than a wagon canopy.

SUMMARY OF THE INVENTION

The present invention serves to overcome the deficiencies identified in the prior art. It is therefore the primary object of the present invention to provide an adjustable multi-purpose wagon canopy which can be releasably attached to wagons of varying sizes and which can be erected in soft ground.

The above object is achieved by providing an adjustable multi-purpose wagon canopy comprising: at least three support members with each support member having a first end and a second end wherein the first end tapers; an adjustable cover; means to attach the adjustable cover to the support members; and at least three mounting bracket assemblies attached to a wagon for releasably receiving the support members, wherein said wagon canopy is height-adjustable.

Preferably, the number of support arms is four, the first end of said support members further includes a plurality of primary diametrically opposed apertures positioned above said taper, the adjustable cover comprises a top and four sides, and the number of mounting bracket assemblies is four.

More preferably, the mounting bracket assemblies comprise: a cylindrical mounting sleeve with at least one pair of secondary diametrically opposed apertures; and at least one support bracket for affixing said mounting sleeve to a wall of said wagon, wherein said support member slides telescopically into said mounting sleeve and is height-adjusted by aligning said primary and secondary diametrically opposed apertures and inserting locking means therethrough.

Conveniently, the locking means comprises a bolt and nut or locking pin.

More conveniently, the adjustable cover includes at least one row and at least one column of holes with a drawstring extending through each row and each column of holes.

Most conveniently, the means to attach the adjustable cover to the support members comprises a hook and loop fastener arrangement wherein hook fastener strips extend vertically along the second ends of said support members and loop fastener strips are attached diagonally to said adjustable cover beginning from each respective corner of said adjustable cover.

In yet another embodiment of the invention, a kit for the assembly of an adjustable multi-purpose wagon canopy comprises: four support members with each support member having a first end and a second end wherein the first end tapers; an adjustable cover; means to attach the adjustable cover to the support members; and four mounting bracket assemblies attached to a wagon for releasably receiving the support members, wherein said wagon canopy is height-adjustable.

The advantages of the present invention are numerous. The mounting bracket assemblies can be easily positioned on the wagon and in conjunction with the support members provide a rigid structure to support the cover. Further, the support members are height-adjustable to accommodate children of varying height who may be seated in the wagon. As well, the cover can be adjusted in both width and length to accommodate different size wagons which require different positioning of the support members. Finally, since the support members have tapered ends and can be readily removed, the wagon canopy assembly can be repositioned in an area with soft or sandy ground with minimal effort.

BRIEF DESCRIPTION OF THE DRAWINGS

A better understanding of the invention will be obtained by considering the detailed description below, with reference to the following drawings in which:

FIG. 8 depicts a first canopy attachment means, FIG. 9 depicts a second canopy attachment means, FIG. 10 depicts a third canopy attachment means, FIG. 11 is a cut away side view of a second mounting bracket assembly.

DETAILED DESCRIPTION OF THE PREFERRED EMBODIMENT

Figure 1:
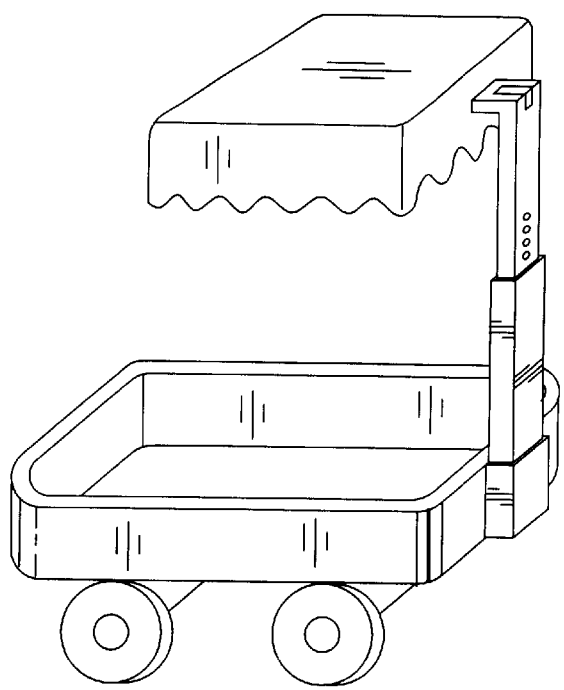
FIG. 1 is a perspective view of a first wagon canopy in accordance with the prior art.
Figure 2:
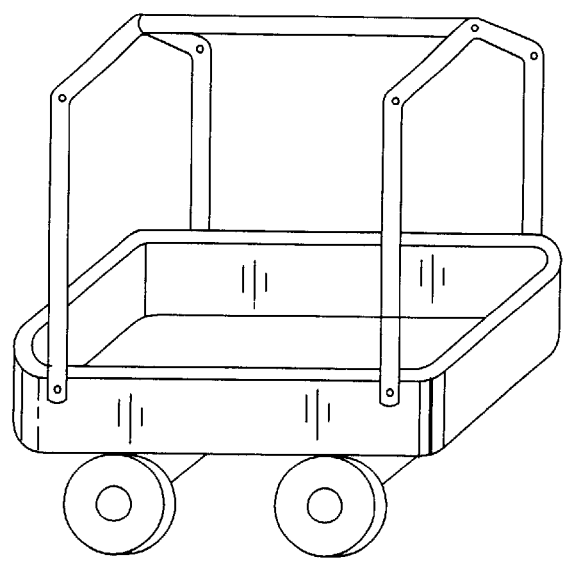
FIG. 2 is a perspective view of a second wagon canopy in accordance with other prior art.
Figure 3:
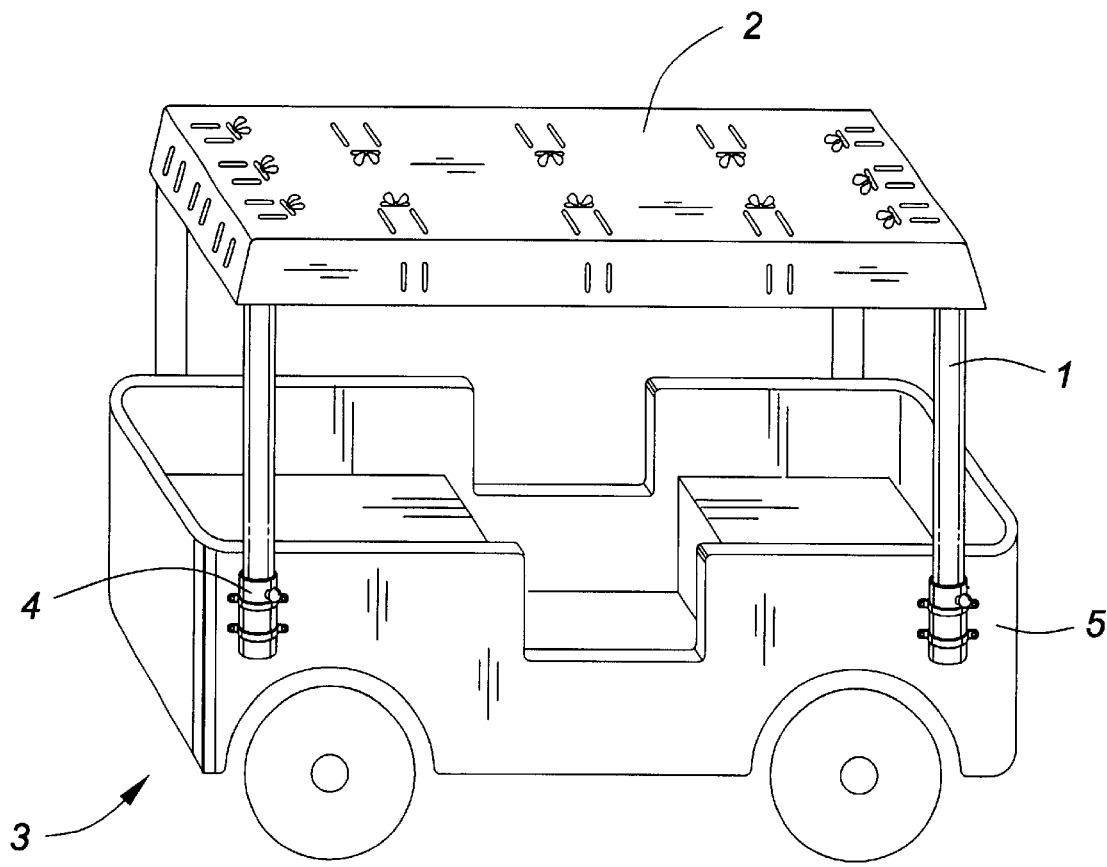
FIG. 3 is a perspective view of a wagon canopy in accordance with the present invention.

Referring to FIG. 3, a wagon canopy in accordance with the present invention is disclosed. Support members 1 suspend adjustable cover 2 and are secured to wagon 3 using mounting bracket assemblies 4 which are positioned against wagon wall 5.

Figure 4:
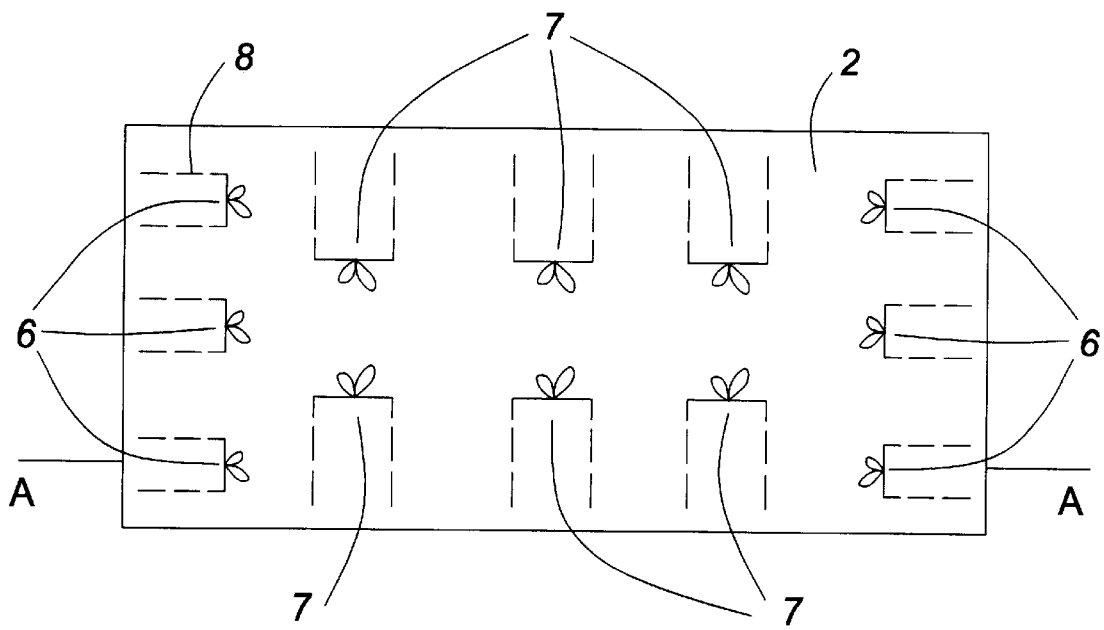
FIG. 4 is a top view of the canopy with an integral drawstring arrangement.
Figure 5:
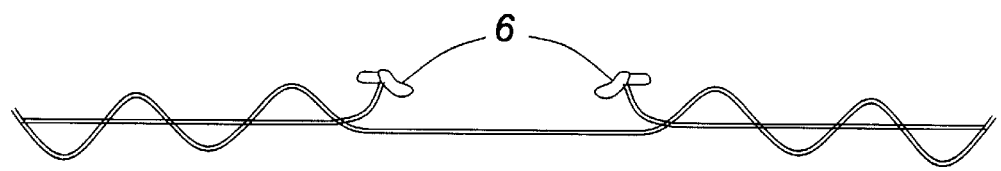
FIG. 5 is a sectional side view of an adjusted canopy about the line A—A of FIG. 4.
Figure 6:
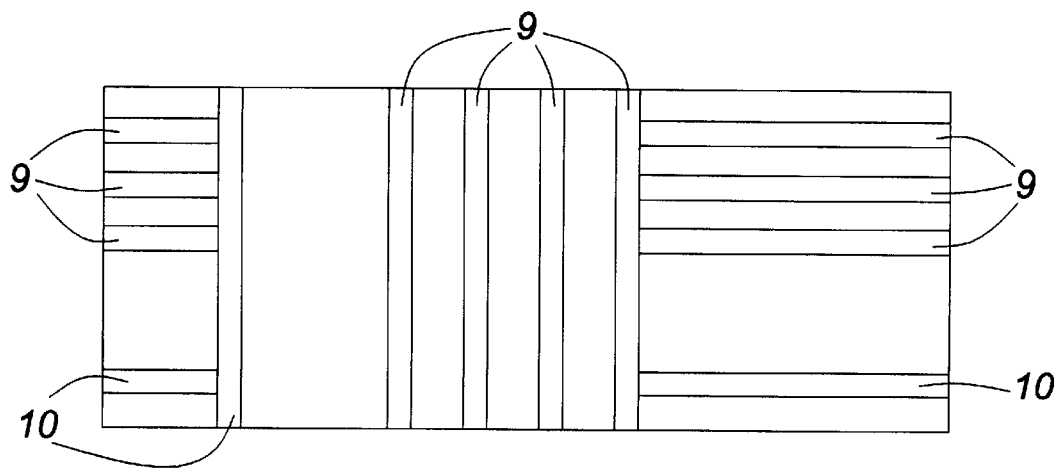
FIG. 6 is a top view of the canopy with an arrangement of hook and loop fastener strips.

The workings of the individual parts will now be examined. FIGS. 4 through 6 depict two means for adjusting the cover 2, with the preferred embodiment shown at FIGS. 4 and 5. It will be understood by those skilled in the art that wagons are commercially available in a variety of sizes. It is therefore necessary to be able to adjust cover 2 in both width and length to accommodate a variety of wagons which may require the mounting bracket assemblies 4 to be positioned differently depending on the wagon being used. If an adjustable cover is not provided, separate covers will need to be manufactured for each wagon, thereby increasing manufacturing costs of the wagon canopy. As shown in FIG. 4, drawstrings 6 and 7 are threaded through cover 2 in both a longitudinal and horizontal direction using evenly spaced apertures 8 located along the cover 2, which is preferably made of canvas, cotton or the like. Apertures 8 may be reinforced using grommets or the like to prevent tearing of the cover material. Referring to FIG. 5, if drawstrings 6 are pulled inwardly, the cover 2 will fold at regular intervals, resulting in the cover 2 being shortened longitudinally. Using drawstrings 7, similar horizontal adjustments can be made to cover 2.

Alternately, as shown in FIG. 6, the adjustable cover 2 could also be modified in width and length using a hook and loop fastening system, such as the product marketed under the registered trademark Velcro. FIG. 6 depicts the arrangement of the hook strips 9 and loop strips 10 on the adjustable cover 2. This arrangement allows the canopy to be folded along its width and length to predetermined sizes. To adjust both length and width, the cover must first be folded horizontally and then longitudinally. Persons skilled in the art will recognize that other means including, but not limited to, buttons, snaps, or interlocking slide fasteners may be used to secure the folds and these are meant to be included in the scope of the invention.

Figure 7:
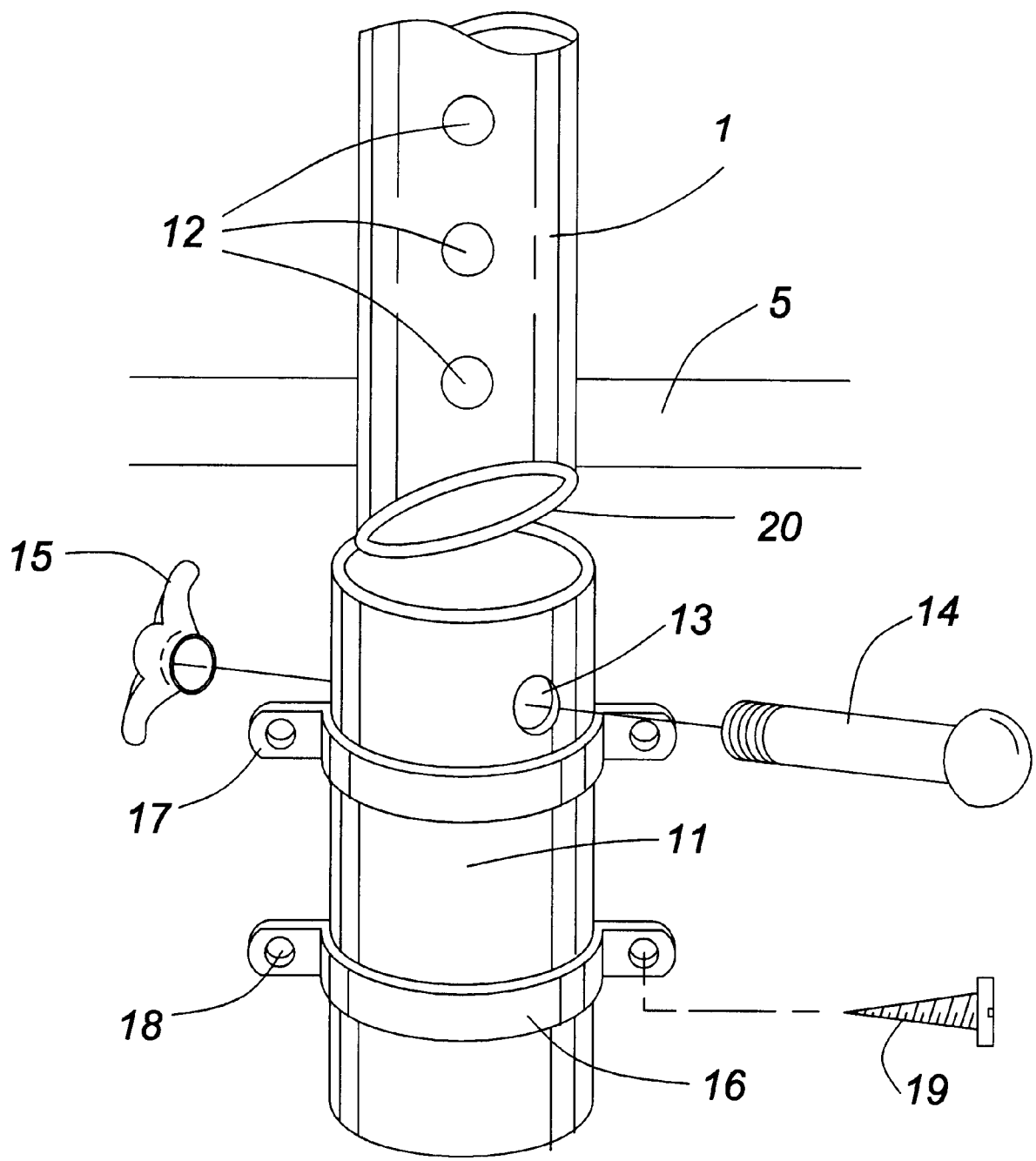
FIG. 7 is an exploded view of a first mounting bracket assembly.

Referring now to FIG. 7, the preferred embodiment of the mounting bracket assembly 4 is shown. Support member 1 slides longitudinally into mounting sleeve 11. The support members 1 include pairs of diametrically opposed holes 12 (only one of which is shown) while a pair of diametrically opposed holes 13 (only one of which is shown) are located along mounting sleeve 11. In operation, a pair of holes 12, is aligned with holes 13, to allow bolt 14 to be inserted. Bolt 14 is secured in place by wing nut 15. In this way support member 1 is height-adjusted for children of varying sizes. The height can be simply readjusted by removing the wing nut 15 and bolt 14 and then aligning a different pair of holes 12 with holes 13 and then re7 engaging bolt 14 and securing it with wing nut 15. It will be understood by those skilled in the art that the bolt and wing nut arrangement could be replaced with a locking pin or similar device and that these alternate means are meant to be included in the scope of the invention. U-shaped support brackets 16 secure mounting sleeve 11 to wagon wall 5. Integral to u-shaped support brackets 16 are tabs 17 with apertures 18 extending therethrough. Screws 19 are inserted through apertures 18 and fastened into wagon wall 5. In the preferred embodiment, at least two unshaped support brackets 16 are used to secure mounting sleeve 11 to wagon wall 5.

Referring now to FIG. 8, the use of a hook and fastener arrangement used to secure the adjustable cover 2 to support members 1 is detailed. A hook strip 21 is attached vertically to the upstanding end of each support member 1 (the other end being tapered as depicted in FIG. 7). A loop strip 22 is sewn diagonally from each corner of cover 2. In operation, each corner of cover 2 is folded over each upstanding end of support member 1 and the hook and loop fastener strips 21, 22 are connected at a point where the canvas no longer droops between support members 1.

In conjunction with the means for adjusting the cover 2 shown in FIG. 6, several means of attaching the adjustable cover 2 to the support member 1 are illustrated in FIGS. 9 and 10. FIG. 9 illustrates the use of reinforced pockets 23 sewn into each inside corner of the adjustable cover 2. Each support member 1 is then inserted into a respective reinforced pocket 23 and is secured in place by the stitching on the reinforced pocket 22. A variation of the attachment means depicted in FIG. 9 is shown in FIG. 10. A-cup shaped pocket 24 is sewn into the corner of adjustable cover 2 either on the inside or outside surface of the adjustable cover 2 (an external embodiment is shown in FIG. 10). The top of each support member 1 is then inserted into a respective cup shaped pocket 24 thereby securing the four corners of adjustable cover 2.

Figure 12:
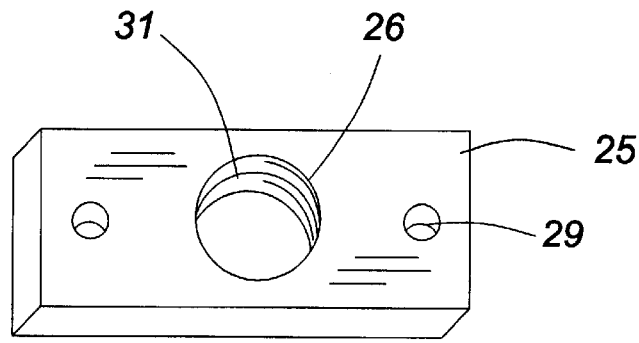
FIG. 12 is a top view of the second mounting bracket assembly.

Although the preferred embodiment for attaching the wagon canopy to wagon 3 has been described, alternate embodiments of the mounting bracket assembly 4 are shown in FIGS. 11 through 14. In FIGS. 11 and 12, a first alternate embodiment is depicted. T-shaped mounting bracket assembly is comprised of: a plate 25 with a central aperture 26; and an internally threaded cylinder 27 axially aligned with the central aperture 26 of and attached to plate 25. The T-shaped mounting bracket assembly is inserted into a pre-drilled hole in the top edge of wagon wall 5 by means of screws 28 which are fitted through anchoring holes 29 symmetrically positioned on plate 25. If the wagon walls are thin, an expanding sleeve 30 can be used in combination with screws 27 to secure the T-shaped mounting bracket assembly to the wagon. Alternately, rivets or a screw and expanding sleeve combination may be used to secure the T-shaped mounting bracket assembly to the top edge of wagon wall 5. The internal threads 31 of threaded cylinder 27 are designed to be mated to a threaded end 32 of the support member 1.

Figure 13:
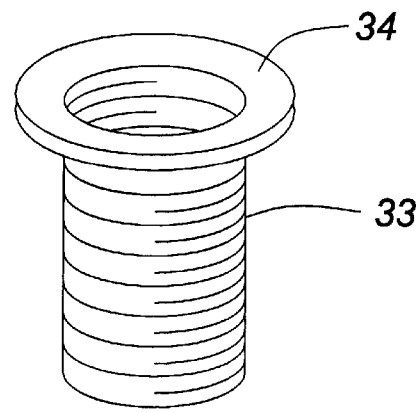
FIG. 13 is an oblique view of a third mounting bracket assembly.
Figure 14:
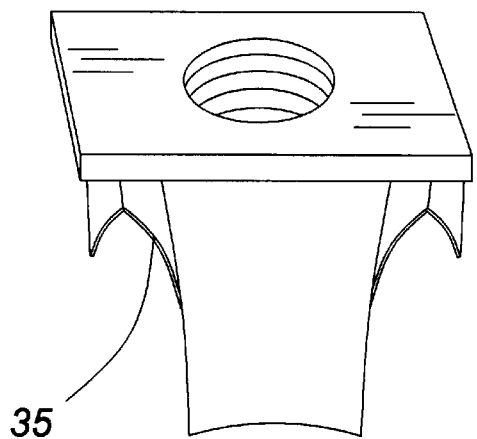
FIG. 14 is an oblique view of a fourth mounting bracket assembly.

Second and third alternate mounting bracket assemblies are shown in FIGS. 13 and 14 and would also work satisfactorily to secure support members 1. FIG. 13 depicts a mounting bracket that is both internally and externally threaded. Taking advantage of the external threading 33, the bracket itself would be screwed into a pre-drilled hole in the top edge of wagon wall 5, until circular flange 34 was seated against the wall edge. This would eliminate the need for anchoring means such as screws 28. With the mounting bracket in place, an externally threaded support member 1 as shown in FIG. 11 would then be screwed into the mounting bracket. FIG. 14 details a third form of mounting bracket which is also internally threaded and which uses spring loaded wings 35 to secure the mounting bracket against the top edge of wagon wall 5 when the mounting bracket is inserted in a pre-drilled hole in the wall edge. As with the mounting bracket depicted in FIG. 13, when the mounting bracket is secured an externally threaded support member 1 as depicted in FIG. 11 is screwed into the bracket.

It should be understood that in the event that one of the mounting bracket assemblies depicted in FIGS. 11 through 14 is used, the height-adjustment mechanism would be integrated into the support arm 1. The height adjustment mechanism would comprise an outer member which receives an inner telescoping member and a locking mechanism which locks the inner telescoping member to the outer member.

The use of the wagon canopy can now be discerned. Firstly, the user attaches the mounting bracket assembly 4 to the wagon wall 5 of wagon 3. Secondly, the support members 1 are then fastened to their respective mounting bracket assembly 4 which includes height-adjusting them as desired. Thirdly, drawstrings 6, 7 or hook and loop fastener strips 9, 10 are used to adjust the cover 2 to the proper width and length. Finally, the adjustable cover 2 is attached to support members 1 by means of the hook and loop fastener strips 21, 22 (if drawstrings 6, 7 are used), or the reinforced pocket 23 or the cup shaped pocket 24 (if hook and loop fastener strips 9, 10 are used). Should the user wish to use the canopy to provide shade and shelter away from the wagon 3, the support members 1 can be removed from the mounting bracket assemblies 4 and then transplanted to a location with either sandy or soft ground. The user then impales the tapered ends of the support members 1 (shown as 20 in FIG. 7) into the sandy or soft ground. The canopy thereby provides shade or shelter away from the wagon 3.

A person understanding this invention may now conceive of alternative structures and embodiments or variations of the above all of which are intended to fall within the scope of the invention as defined in the claims that follow.

The embodiments of the invention in which an exclusive property or privilege is claimed are defined as follows:

1. An adjustable multi-purpose wagon canopy comprising:

at least three support members with each support member having a first end and a second end wherein the first end tapers;

an adjustable cover;

means to attach the adjustable cover to the support members; and at least three mounting bracket assemblies attached to a wagon for releasably receiving the support members, wherein said wagon canopy is height-adjustable, the number of support members is four and the first end of said support members further includes a plurality of primary diametrically opposed apertures positioned above said taper; and the number of mounting bracket assemblies is four.

2. The device of claim 1 wherein the mounting bracket assemblies comprise: a cylindrical mounting sleeve with at least one pair of secondary diametrically opposed apertures; and at least one support bracket for affixing said mounting sleeve to a wall of said wagon, wherein said support member slides telescopically into said mounting sleeve and is height-adjusted by aligning said primary and secondary diametrically opposed apertures and inserting locking means therethrough.

3. The device of claim 2 wherein the locking means comprises a bolt and nut or locking pin.

4. The device of claim 3 wherein the adjustable cover includes at least one row and at least one column of holes with a drawstring extending through each row and each column of holes.

5. The device of claim 4 wherein the means to attach the adjustable cover to the support members comprises a hook and loop fastener arrangement wherein a hook fastener strip extends vertically along each of the second ends of said support members and a loop fastener strip is attached diagonally to said adjustable cover beginning from each respective corner of said adjustable cover.

6. The device of claim 1, the support members further including height-adjustment means comprising an outer member which receives an inner telescoping member and a locking mechanism; each first end further includes an externally threaded portion above the taper; and the number of mounting bracket assemblies is four.

7. The device of claim 6 wherein the mounting bracket assemblies comprise: a plate with a central aperture; an internally threaded cylinder axially aligned with said aperture and attached to said plate; anchoring means; and at least one anchoring aperture located on said plate and which receives said anchoring means.

8. The device of claim 7 wherein the anchoring means is taken from the group consisting of screws, rivets and a screw and expanding sleeve combination.

9. The device of claim 8 wherein the top of the adjustable cover includes Velcro adjustment means wherein hook strips are positioned along a portion of the width of the cover and parallel to fastener strips and a horizontal edge; and wherein hook strips are positioned along a portion of the length and parallel to fastener strips and a longitudinal edge.

10. The device of claim 9 wherein the means to attach the adjustable cover to the support members comprises reinforced pockets located at the corners of the adjustable cover and which receive the second end of said support members.

11. The device of claim 9 wherein the means to attach the adjustable cover to the support members comprises a plurality of cylindrical pockets attached to the outside corners of the cover, and which receive the second end of said support members.

* * * * *